Nov. 8, 1938.  A. M. DIEZ ET AL  2,136,284
ELECTRICALLY OPERATED SHIFTING MECHANISM
Filed Nov. 30, 1936
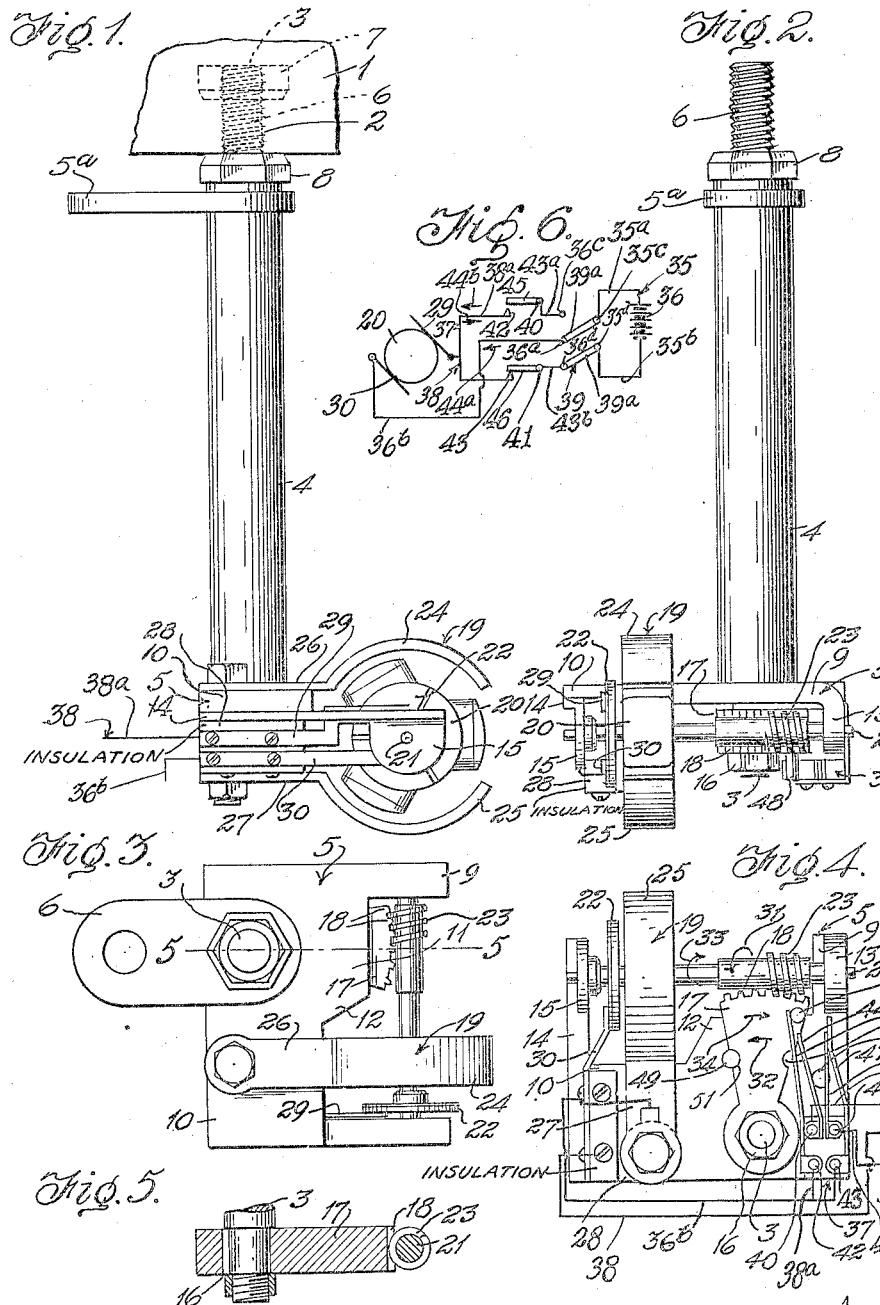
Inventors
Angel M. Diez and
Trude Neuhaus May,
By Kimmel & Crowell,
Attorneys Patented Nov. 8, 1938

2,136,284

UNITED STATES PATENT OFFICE 2,136,284

ELECTRICALLY OPERATED SHIFTING MECHANISM

Angel M. Diez and Trude Neuhaus May, Mexico, D. F., Mexico

Application November 30, 1936, Serial No. 113,492
In Mexico October 6, 1936

3 Claims. (Cl. 240—61.9)

This invention relates to an electrically operated shifting mechanism designed primarily for use in connection with the headlights of automotive vehicles, but it is to be understood that the shifting mechanism, in accordance with this invention is to be employed for any purpose for which it may be found applicable.

The invention aims to provide, in a manner as hereinafter set forth, a normally inactive electrically operated shifting mechanism for the headlight of an automotive vehicle, under the control of the driver, and provides, when active, for shifting the headlights at an angle to the right whereby the light rays will be directed in a manner to prevent the sight of a driver of an oncoming vehicle from being dazzled or blinded resulting in materially reducing the possibility of collisions to a minimum, as well as providing for illuminating the sides of the road and curves thereby increasing visibility and insuring for safe driving.

A further object of the invention is to provide, in a manner as hereinafter set forth, an electrically operated shifting mechanism for a headlight including a reversible electric motor for moving in opposite directions a shifting structure for the headlight and with means coacting with said structure for limiting the movement of the latter in opposite directions.

Further objects of the invention are to provide, in a manner as hereinafter set forth, a shifting mechanism for the headlights of automotive vehicles which is comparatively simple in its construction and arrangement, strong, durable, compact, thoroughly efficient in its use, easily operated for shifting the headlights, readily assembled, having the major portion thereof protected by part of the automotive vehicle and comparatively inexpensive to manufacture.

With the foregoing and other objects which may hereinafter appear, the invention consists of the novel construction and arrangement of parts as will be more specifically described and are as illustrated in the accompanying drawing, wherein is shown an embodiment of the invention, but it is to be understood that changes, variations and modifications may be resorted to which fall within the scope of the invention as claimed.

In the drawing:

Figure 1 is a side elevation of the mechanism,
Figure 2 is a rear elevation,
Figure 3 is a top plan view,
Figure 4 is a plan view looking towards the lower face of the mechanism,
Figure 5 is a section on line 5—5, Figure 3, and
Figure 6 is a diagrammatic view of the electrical circuit for the device.

Referring to the drawing, 1 indicates a headlight which is detachably connected, as at 2 to the upper end of a rotatable vertical post or shaft 3. A vertical column 4 is fixed at its lower end to a horizontally disposed stationary supporting plate 5. An apertured stationary bracing arm 5ª encompasses the column 4 in proximity to the upper end of the latter. The upper end portion 6 of post 3 is reduced and threaded. The portion 6 extends into the headlight casing from bottom thereof and is to have threaded engagement with such casing. The portion 6 carries upper and lower clamping nuts 7, 8 respectively. The nut 8 bears on the upper end of column 4. The post 3 depends below plate 5. The latter is secured at the desired point on the vehicle.

The plate 5 (Figure 3) includes a pair of end parts 9, 10 and a pair of intermediate parts 11, 12. The part 9 is of greater width but of materially less length than part 10. The part 11 is of less width and of greater length than part 9. The part 11 is of greater width than parts 10 and 12. The outer side edges of parts 9, 10, 11 and 12 are flush with each other. The part 11 at one end merges into the inner end of part 9. The part 12 at one end merges into the inner end of part 11 and the part 10 merges at one end into the other end of part 12. The latter gradually increasing in width from part 10 to part 11. The inner side edges of the parts 9, 10, 11 and 12 do not align with each other. The post 3 extends through part 11. Carried by and depending from the part 9 is a bearing member 13. Secured to the lower face of and extending inwardly from part 10 is an arm 14 carrying a depending bearing member 15 which aligns with the member 13.

The lower end of post 3, below portion 11, of plate 5 has fixed therewith, as at 16 the inner end of a segment-shaped arm 17 having its outer edge formed throughout with worm teeth 18. The post 3 and arm 17 provides a shifting means for the headlight.

An actuating structure 19 is provided for moving the arm 17 in opposite directions. The said structure includes a reversible electric motor 20 having its shaft 21 extended and journaled in the bearing members 13, 15. The shaft 21 carries a commutator 22 and a worm 23. The magnetic fields of the motor 20 are provided by a pair of oppositely disposed curved metallic straps 24, 25 formed with shanks 26, 27 respectively. The shank 26 is secured to the part 10 of plate 5. The shank 27 is secured to the bottom of a vertical block 28 of insulation anchored to and depending from part 10 of plate 5. The brushes associated with the commutator 22 are indicated at 29, 30 and are secured to and extend inwardly from block 28. The worm 23 meshes with the teeth 18. On the operation of motor 20 for the purpose of driving shaft 21 in the direction of the arrow 31 the arm 17 will be moved in the direction of the arrow 32 and the headlight will be shifted to the right. When shaft 21 is driven by the motor in the direction of the arrow 33, the arm 17 will be moved in the direction of the arrow 34 whereby the headlight will be shifted to the left.

The electrical feed or power line is generally indicated at 35 and it includes (Figure 6) a pair of circuit conductors 35a, 35b, leading from the electrical source 36 to a pair of terminals 35c, 35d, a contact 36a, a circuit conductor 36b leading from the contact 36a to the brush 30 and which is common to said circuit and the operating circuit 38 for the motor, contacts 36c, 36d, a circuit conductor 43a leading from contact 36c, and a circuit conductor 43b leading from contact 36d.

Interposed in the circuit 35 is a reversing switch 39 having its blades 39a pivoted to the terminals 35c, 35d. The contacts 36a, 36d are to be electrically engaged in unison by the blades 39a when these latter are shifted simultaneously in one direction. The contacts 36a, 36c are to be electrically engaged in unison by the blades 39a when the blades are shifted simultaneously in the opposite direction.

There is associated with the circuits 35, 38 a circuit or current path controlling structure 37 for the motor operating circuit 38 including a pair of spaced binding posts 40, 41 and a pair of spaced binding posts 42, 43 which are spaced from the posts 40, 41. The circuit conductor 43a is electrically connected to the post 40. The circuit conductor 43b is electrically connected to the post 41. A circuit conductor 38a of the motor circuit 38 leads from the binding posts 42, 43 to the brush 29. The structure 37 includes two spaced aligned pairs of resilient contacts. The contacts of each pair are normally engaged. The contacts of one pair are indicated at 44, 45 and those of the other pair at 46, 47. The contacts 45, 47 are of greater length than and project from the contacts 44, 46. The contacts 44, 46 are electrically connected at one end to the binding posts 40, 41 respectively and arranged between the contacts 45, 47. The contacts 45, 47 are electrically connected at one end to the binding posts 42, 43 respectively. The structure 37 includes an insulated operating member or controller 48 which is spaced from the outer ends of the contacts 44, 46 and arranged between the parts of the contacts 45, 47 which project from the contacts 44, 46. The member 48 is common to and is for selective engagement with the projected parts of the contacts 45, 47 for moving them selectively from contacting relation with respect to the contacts 44, 46. The member 48 is anchored to one face of arm 17 in proximity to a side edge and also in proximity to the teeth 18 of arm 17.

It will be assumed that the switch 39 is in the position shown in Figure 6, the power circuit open, the contacts 46, 47 engaged and the contacts 44, 45 disengaged, then the path of travel of the motor operating circuit will be as indicated by the arrows 44a, whereby the motor will operate in the direction of the arrow 33, moving arm 17 in a clockwise direction as indicated by arrow 34 resulting in the shifting of the post 4 in a clockwise direction. A pair of stops, to be referred to, are employed for limiting the movement of the arm 17 in opposite directions. When the arm 17 is traveling in a clockwise direction, as indicated by arrow 34, the member 48 engages contact 47 and shifts and holds it from contacting relation with respect to contact 46 breaking the path control, at which time the travel of arm 17 will be arrested by one of the stops to be referred to. When arm 17 travels in a clockwise direction, it releases contact 45 so it will spring into contact relation with respect to contact 44. Now, it will be assumed that the switch 39 is in a position opposite to that shown in Figure 6, that is to say, in engagement with the contacts 36a, 36c, the power circuit open, the contacts 44, 45 engaged, then the path of travel of the motor operating circuit 38 will be as indicated by the arrows 44b, whereby the motor will be operated in the direction of the arrow 31, moving arm 17 in an anti-clockwise direction, as indicated by arrow 32, resulting in the shifting of post 4 in an anti-clockwise direction. When the arm 17 is traveling in an anti-clockwise direction, as indicated by the arrow 32, the member 48 engages contact 45 and shifts and holds it from contacting relation with respect to contact 44 breaking the path control, at which time the travel of arm 17 in an anti-clockwise direction will be arrested by the other of the stops to be referred to. When arm 17 travels in an anti-clockwise direction it releases contact 47 whereby the latter springs into contact relation with respect to contact 46.

Carried by the parts 9 and 11 of the plate 5 is a pair of stops 49, 50. The stop 49 is adapted to seat in a recess 51 formed in one side edge of arm 17 for limiting the shifting of the latter in one direction and the stop 50 is adapted to seat in a recess 52 formed in the other side edge of arm 17 for limiting the shifting of the latter in the other direction. The stops 49, 50 are disposed in offset relation with respect to each other. The recesses 51, 52 are arranged in transverse alignment with respect to the arm 17.

The structure 37 not only functions as a circuit or current travel control, but further functions for automatically cutting off the current from the motor at the end of a clockwise or anti-clockwise shift of post 4 and which avoids a waste of battery current and the possibility of the motor burning. This automatic cut-off is had on the moving of contact 44 from contacting relation with contact 45 and the shifting of contact 47 from contacting relation with contact 46.

The switch 39 is to be mounted on the dashboard of the vehicle in convenient reach of the driver.

What we claim is:

1. In a headlight shifting mechanism, a rotatable post for carrying the headlight, an oscillatory toothed arm of segmental contour fixed to the post for rotating the latter in opposite directions, a reversible electrically operated motor structure including a worm for oscillating said arm, a power line having interposed therein a reversible switch, a motor operating circuit, a current travel control and automatic current cut-off structure including two spaced pairs of resilient contact members, the members of each pair being for contactable engagement, one of the members of each pair being shiftable relative to and having a part thereof extended beyond one end of the other member of the pair, the said shiftable members of said pairs being connected to the motor operating circuit, the other members of said pairs being electrically connected to the power line, and a controller normally bearing against the part of a shiftable member for releasably holding it out of contact relation with its associated member, said controller being carried by said arm, spaced from the said other members and operating between the said parts of the shiftable members to provide, on the operation of the arm, for selectively engaging with said parts to selectively separate the contacts of said pairs from contractable engagement, said arm having its side edges provided with recesses, and a pair of spaced stops disposed in offset relation with respect to each other and selectively engaging in a recess for arresting the movement of the arm in one direction.

2. In a headlight shifting mechanism, a rotatable post for carrying the headlight, an oscillatory toothed arm of segmental contour fixed to the post for rotating the latter in opposite directions, a reversible electrically operated motor structure including a worm for oscillating said arm, a power line having interposed therein a reversible switch, a motor operating circuit, a current travel control and automatic current cut-off structure electrically connected to said operating circuit and to said power line, and a controller for said structure, said controller being carried by said arm in proximity to one side edge and the teeth thereof, said arm being provided in its side edges with recesses disposed in transverse alignment with respect to the arm, and a pair of spaced stops arranged in offset relation with respect to each other for selectively engaging in a recess for arresting the movement in one direction of the arm.

3. In a headlight shifting mechanism, a rotatable post for carrying the headlight, a horizontally disposed oscillatory toothed arm of segmental contour fixed to the post for rotating the latter in opposite direction, a reversible electrically operated motor structure including a worm for oscillating said arm, a power line having interposed therein a reversible switch, a motor operating circuit, a current travel control and automatic current cut-off structure including two spaced pairs of resilient contact members and with the contacts of each pair for contactable engagement, and a controller for said structure carried by said arm for selective shifting of a contact of each of said pairs, on the operation of the arm for controlling the travel and the automatic cut-off of the current, said arm having its side edges provided with recesses arranged in transverse alignment with respect to the arm, and a pair of spaced stops disposed in offset relation with respect to each other and selectively engaging in a recess for arresting the movement of the arm in one direction.

ANGEL M. DIEZ.
      TRUDE NEUHAUS MAY.